US010720792B2

(12) United States Patent
Mueckl et al.

(10) Patent No.: US 10,720,792 B2
(45) Date of Patent: Jul. 21, 2020

(54) PORTABLE PROPANE-FUELED BATTERY CHARGER

(71) Applicant: MILWAUKEE ELECTRIC TOOL CORPORATION, Brookfield, WI (US)

(72) Inventors: Gareth Mueckl, Milwaukee, WI (US); Jeremy R. Ebner, Milwaukee, WI (US); Tauhira Hoossainy, Milwaukee, WI (US); David Rose, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 4 days.

(21) Appl. No.: 15/970,405

(22) Filed: May 3, 2018

(65) Prior Publication Data
US 2018/0254659 A1 Sep. 6, 2018

Related U.S. Application Data

(63) Continuation of application No. 15/093,397, filed on Apr. 7, 2016, now Pat. No. 9,991,737.

(60) Provisional application No. 62/143,952, filed on Apr. 7, 2015.

(51) Int. Cl.
*H02J 7/14* (2006.01)
(52) U.S. Cl.
CPC .......... *H02J 7/1492* (2013.01); *H02J 7/1415* (2013.01)

(58) Field of Classification Search
USPC ....................................................... 320/101
See application file for complete search history.

(56) References Cited

U.S. PATENT DOCUMENTS

| 2007/0296276 | A1* | 12/2007 | Blackman | H02J 5/00 307/64 |
| 2011/0036653 | A1* | 2/2011 | Platt | B60K 1/04 180/65.28 |
| 2014/0277920 | A1* | 9/2014 | Raniere | B60Q 9/00 701/32.8 |
| 2015/0008879 | A1* | 1/2015 | Schneider | H02J 7/0024 320/110 |
| 2015/0089248 | A1* | 3/2015 | Obie | G06F 1/266 713/300 |

* cited by examiner

*Primary Examiner* — Bryce M Aisaka
(74) *Attorney, Agent, or Firm* — Michael Best & Friedrich LLP

(57) ABSTRACT

System and method for a portable propane-fueled battery charger. One system includes a battery charger including a propane fuel line and an engine including an output shaft. The engine is configured to receive propane via the propane fuel line and rotationally drive the output shaft. The battery charger further includes an alternator including a rotor and stator coils. The output shaft is mechanically coupled to the rotor, and the rotor is rotationally driven by the output shaft. An electrical current is induced in the stator coils by rotation of the rotor. The battery charger further includes an electrical circuit that receives the electrical current and is configured to determine when a battery pack is coupled to a battery connector, and charge the battery pack.

20 Claims, 13 Drawing Sheets

PORTABLE PROPANE-FUELED BATTERY CHARGER

RELATED APPLICATIONS

The present application is a continuation application of U.S. Non-provisional application Ser. No. 15/093,397, filed Apr. 7, 2016, now U.S. Pat. No. 9,991,737, which claims priority to U.S. Provisional Application No. 62/143,952, filed Apr. 7, 2015, the entire contents of which are hereby incorporated by reference.

FIELD OF THE INVENTION

The present invention relates to portable battery chargers.

SUMMARY

Embodiments of the invention provide a portable propane-fueled battery charger. The charger includes a propane-fueled engine that drives an alternator to generate electrical power output. The power output by the alternator is used to charge one or more battery packs coupled to the charger.

One embodiment provides a battery charger including a propane fuel line and an engine including an output shaft. The engine is configured to receive propane via the propane fuel line and rotationally drive the output shaft. The battery charger further includes an alternator including a rotor and stator coils. The output shaft is mechanically coupled to the rotor, and the rotor is rotationally driven by the output shaft. An electrical current is induced in the stator coils by rotation of the rotor. The battery charger further includes an electrical circuit that receives the electrical current and is configured to determine when a battery pack is coupled to a battery connector, and charge the battery pack.

Another embodiment provides a method of charging a battery pack. The method includes receiving, by an engine, propane via a propane fuel line. The method further includes starting the engine and rotationally driving an output shaft of the engine. The output shaft is mechanically coupled to a rotor of an alternator. The method further includes inducing an electrical current in stator coils of the alternator and providing the electrical current to an electrical circuit. The method further includes determining, with the electrical circuit, that the battery pack is coupled to a battery connector, and charging, with the electrical circuit, the battery pack.

Another embodiment provides a battery charger including a first plate that supports a propane engine and an alternator. The propane engine is configured to drive the alternator, and the alternator is configured to provide an electrical current to an electrical circuit. The battery charger further includes a second plate that supports the electrical circuit and the first plate. The electrical circuit is configured to charge a battery pack. The battery charger further includes a housing including a lower housing portion and an upper housing portion. The upper housing portion houses the alternator, and the lower housing portion includes a plurality of battery connectors coupled to the electrical circuit to receive charging current.

DETAILED DESCRIPTION

Figure 1:
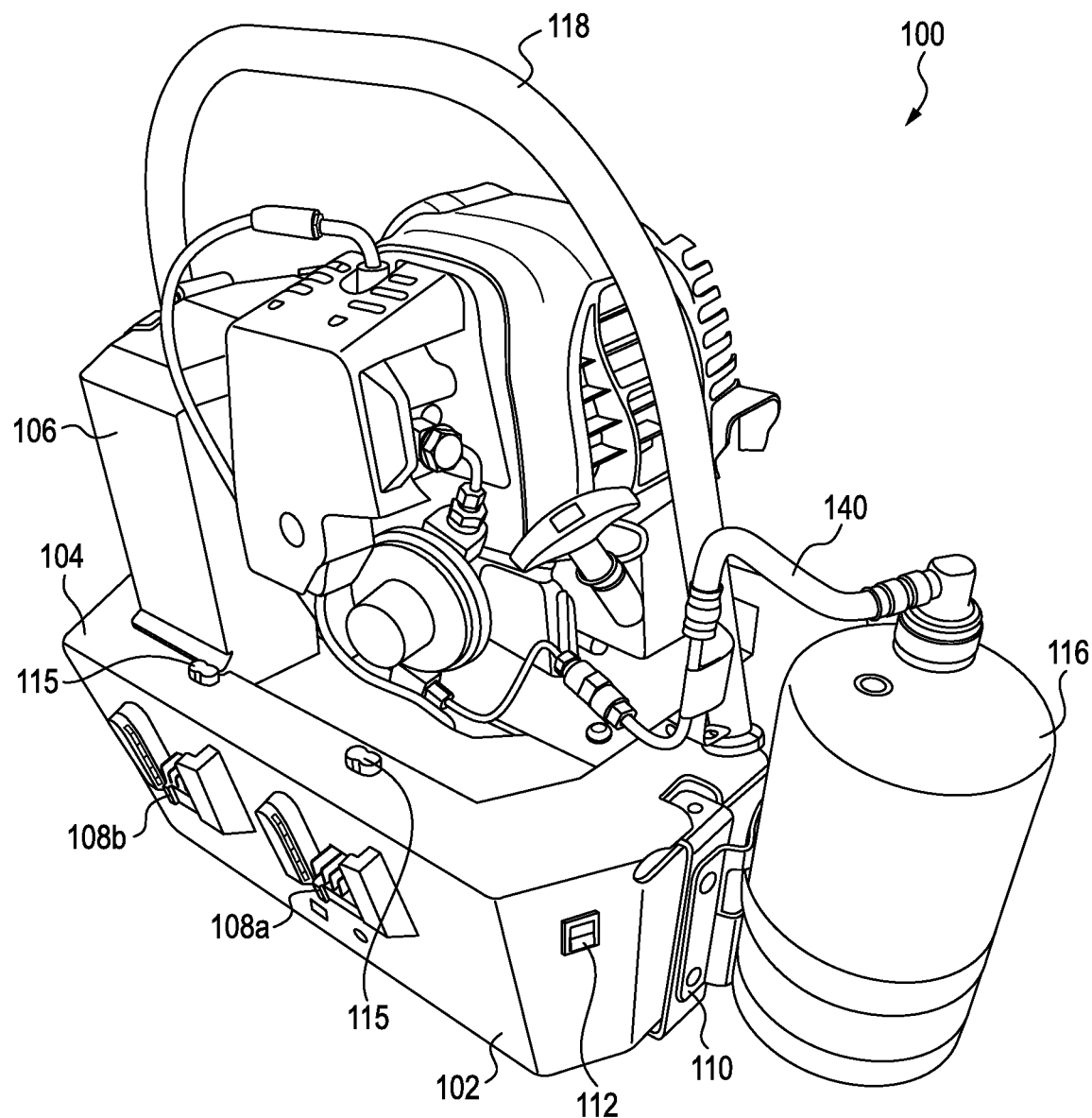
FIG. 1 illustrates a first perspective view of a portable propane-fueled battery charger according to embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

FIGS. 1-7 show a portable, propane-fueled battery charger 100 (charger 100). The charger 100 includes a clamshell housing 102 having a lower housing portion 104 and an upper housing portion 106. The lower housing portion 104 includes six battery connectors 108a-f (collectively, battery connectors 108), a propane tank bracket 110 (a propane tank holder), an on/off toggle switch 112, and a universal serial bus (USB) data port 114. The USB data port 114 enables an external device to connect to and program a microcontroller of the charger 100 (e.g., the MCU 202 of FIG. 9). Each battery connector 108 is associated with a charge indicator 115. The propane tank bracket 110 holds a propane tank 116. A carrying handle 118 extends out of through-holes in the lower housing portion 104 and over the top of the upper housing portion 106.

Figure 7:
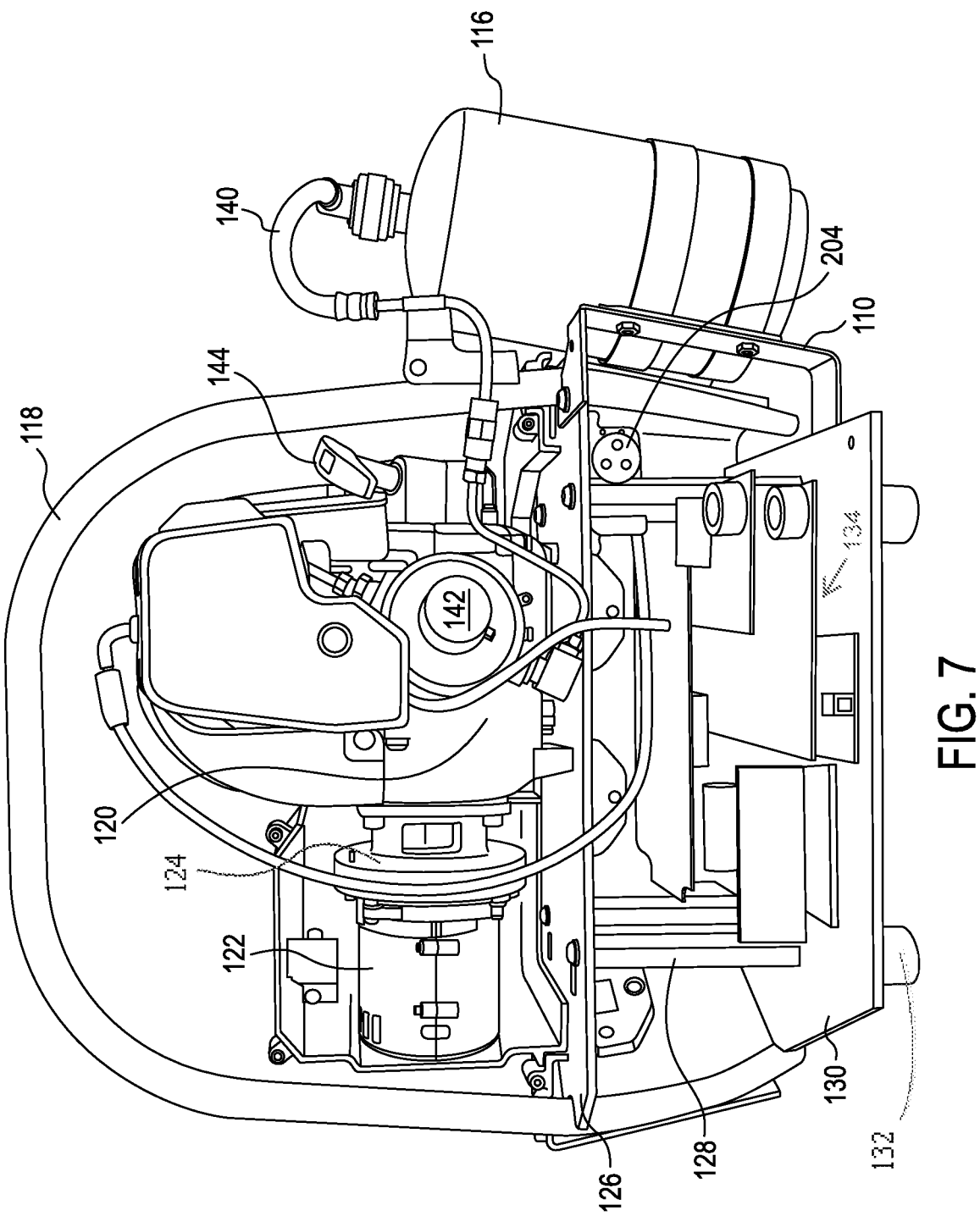
FIG. 7 illustrates another side view of the portable propane-fueled battery charger of FIG. 1 with a portion of the clam shell housing removed.

Turning to FIG. 7, the upper housing portion 106 partially encloses a propane-fueled internal combustion engine 120 (propane engine 120) and an alternator 122. The alternator 122 is mounted to the propane engine 120 via a mounting bracket 124. The propane engine 120 is mounted to an upper support plate 126. The upper support plate 126 is mounted to four support columns 128 that abut the bottom surface of the upper support plate 126 at a substantially perpendicular angle. At their opposite ends, each of the four support columns 128 abut a base plate 130 at a substantially perpendicular angle. Accordingly, the upper support plate 126 and the base plate 130, which are substantially planar, form substantially parallel planes. As illustrated, the upper support plate 126 and the base plate 130 are substantially horizontal, while the four support columns 128 are substantially vertical. The base plate 130 provides support for the four support columns 128 and, therefore, the upper support plate 126. The base plate 130 includes four feet 132 on which the base plate 130 and other components of the charger 100 ultimately rest. The attaching portions of the carrying handle 118 are secured to opposite ends of the base plate 130 and pass through cutouts of the upper support plate 126 before extending out of the lower housing portion 104. A lower portion of the propane tank bracket 110 is secured to the base plate 130 and an upper portion of the propane tank bracket 110 is secured to the upper support plate 126.

The base plate 130, support columns 128, and upper support plate 126 are constructed of metal. The metal construction provides a strong support structure, and the metal has a high thermal transfer property compared to, e.g., plastic. As illustrated in, for instance, FIG. 3, when fully assembled, a top surface of the upper support plate 126 is exposed through a cut-out of the upper housing portion 106 to the ambient environment. The exposure of the metal surface of the upper support plate 126 aids in transferring thermal energy generated within the housing 102 to the ambient environment. For instance, the heat generated by an electrical circuit 134 between the upper support plate 126 and the base plate 130 is transferred to the ambient environment (air) by the combination of the base plate 130, support columns 128, and upper support plate 126. In other words, the combination of the base plate 130, support columns 128, and upper support plate 126 provides heat sinking for the charger 100. Additionally, the upper support plate 126 is a barrier that blocks air from the engine 120 from reaching the electrical circuit 134. The electrical circuit 134 includes for example, one or more printed circuit boards, microcontrollers, interconnecting wires, charging circuits, interconnecting wires, and additional circuitry, and is described in further detail below with respect to FIGS. 10 and 11.

Figure 8:
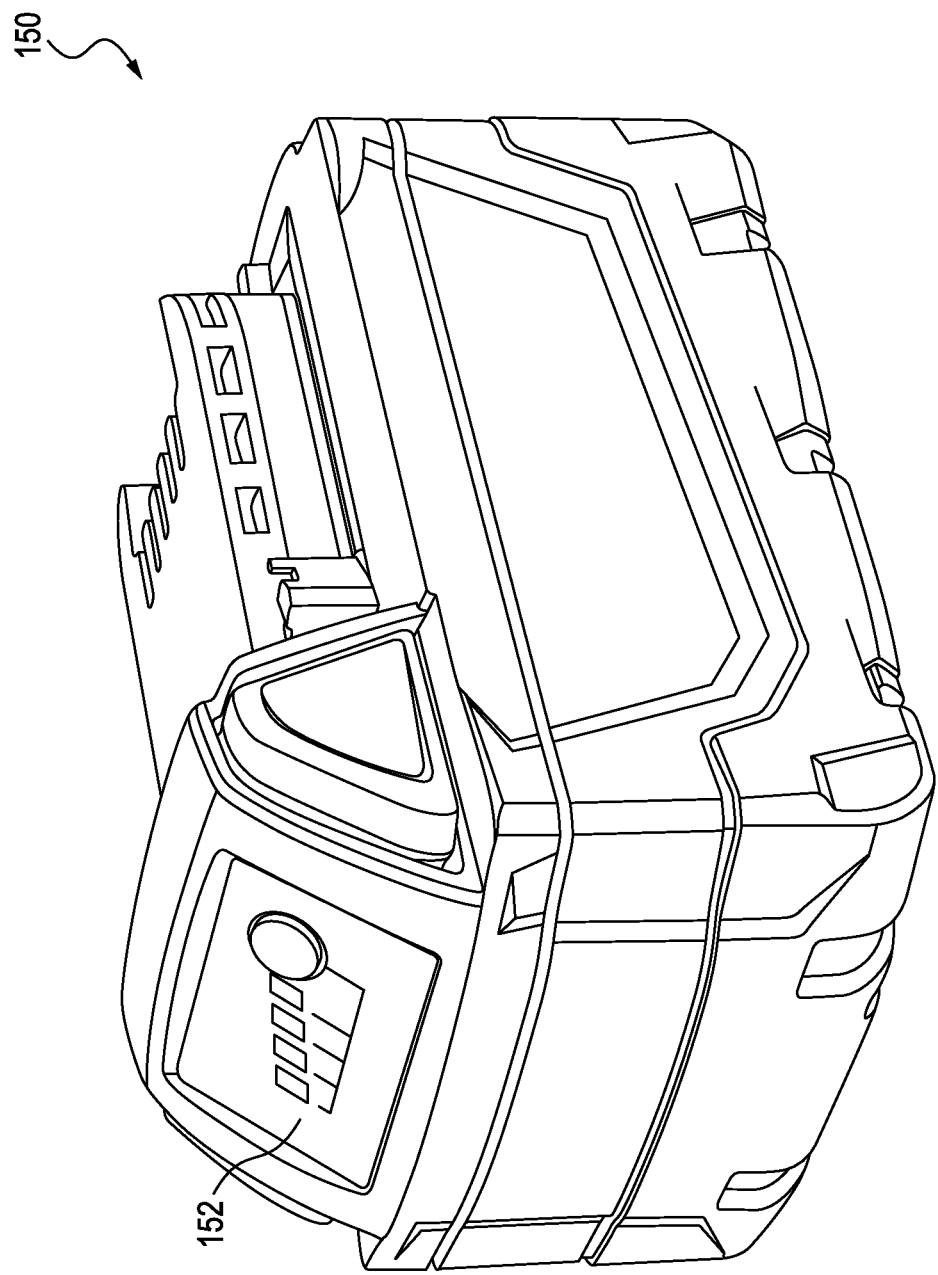
FIG. 8 illustrates a power tool battery pack operable to be charged by a propane-fueled battery charger according to embodiments of the invention.

Each battery connector 108 is configured to receive a power tool battery pack 150 (see FIG. 8). In the illustrated embodiment, the battery pack 150 is a slide-on style battery pack. Accordingly, each battery connector 108 includes guide rails/grooves to receive reciprocal guide rails/grooves of the battery pack 150. In other embodiments, one or more of the battery connectors 108 are configured to receive tower-style battery packs or other styles of battery packs for charging. In addition to the mechanical coupling aspects (e.g., guide rails/grooves) that allow a user to selectively secure the battery pack 150 to the charger 100, each battery connector 108 includes terminals for electrically connecting a coupled battery pack to the electrical circuit 134.

The terminals for the battery pack 150 include a positive and a negative terminal to provide power to and from the battery pack 150. In some embodiments, the battery pack 150 also includes a temperature terminal to allow the charger 100 or a power tool to monitor the temperature of an attached battery pack 150. In some embodiments, the battery pack 150 also includes data terminals to communicate with the charger 100 or an attached power tool. For example, the battery pack 150 may include a microcontroller to monitor one or more characteristics of the battery pack 150 and the data terminals may communicate with the charger 100 regarding the monitored characteristics.

The charge indicator 115 associated with each battery connector 108 signals a charge status of a battery pack connected to that particular battery connector 108, such as charging, fully charged, or fault present. For example, the charge indicator 115 includes two LEDs. In one embodiment, the LEDs may be of different colors, for example green and red. The charge indicator 115 may then show that the battery pack 150 is charging by, for example, flashing a red LED. Alternatively, the charge indicator 115 may show that the battery pack 150 is completely charged by, for example, lighting a green LED.

The battery pack 150 is a power tool battery pack generally used to power a power tool, such as an electric drill, an electric saw, and the like. In some embodiments, each battery pack 150 includes a microcontroller that monitors characteristics of the battery pack 150. For example, the microcontroller may monitor the state of charge of the battery pack 150, the temperature of the battery pack 150, or other characteristics relevant to the battery pack 150. The microcontroller may also control aspects of charging and/or discharging of the battery pack 150. In the illustrated embodiment, the battery pack 150 also includes an indicator 152 on the face of the battery pack 150 to display the current state of charge of the battery pack 150 and/or other characteristics of the battery pack 150. In the illustrated embodiment, the indicator 152 includes a plurality of LEDs. As the state of charge of the battery pack 150 increases, more LEDs light up and as the state of charge of the battery pack 150 decreases, less LEDs light up. The battery pack 150 may include a different type of indicator to display the state of charge of the battery. For example, the indicator 152 may include a single LED that lights up only when the battery pack 150 is fully charged. In other embodiments, the battery pack 150 does not include an indicator.

In the illustrated embodiments, the battery packs 150 include lithium ion cells. In other embodiments, the battery packs 150 may be of a different chemistry, for example, nickel-cadmium, or nickel-hydride. In the illustrated embodiment, the battery pack 150 is an 18 volt battery. In other embodiments, the capacities of the battery packs configured to be charged by the charger 100 are different. For example, the battery packs can be 4 volt battery packs, 12 volt battery packs, 28 volt battery packs, 40 volt battery packs, or another voltage.

Figure 9:
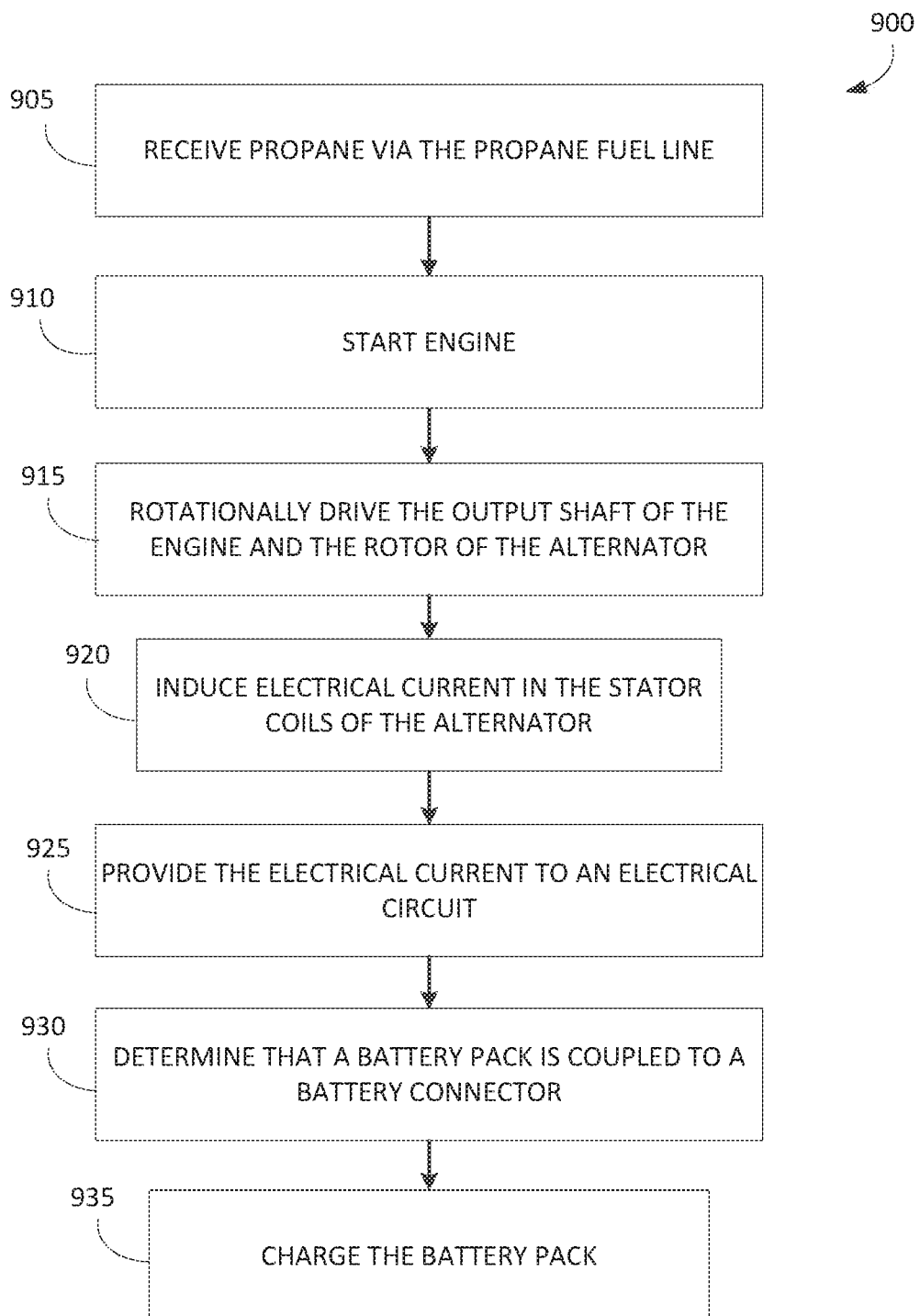
FIG. 9 illustrates a method of operation of the propane-fueled battery charger of FIG. 1 according to some embodiments.
Figure 12:
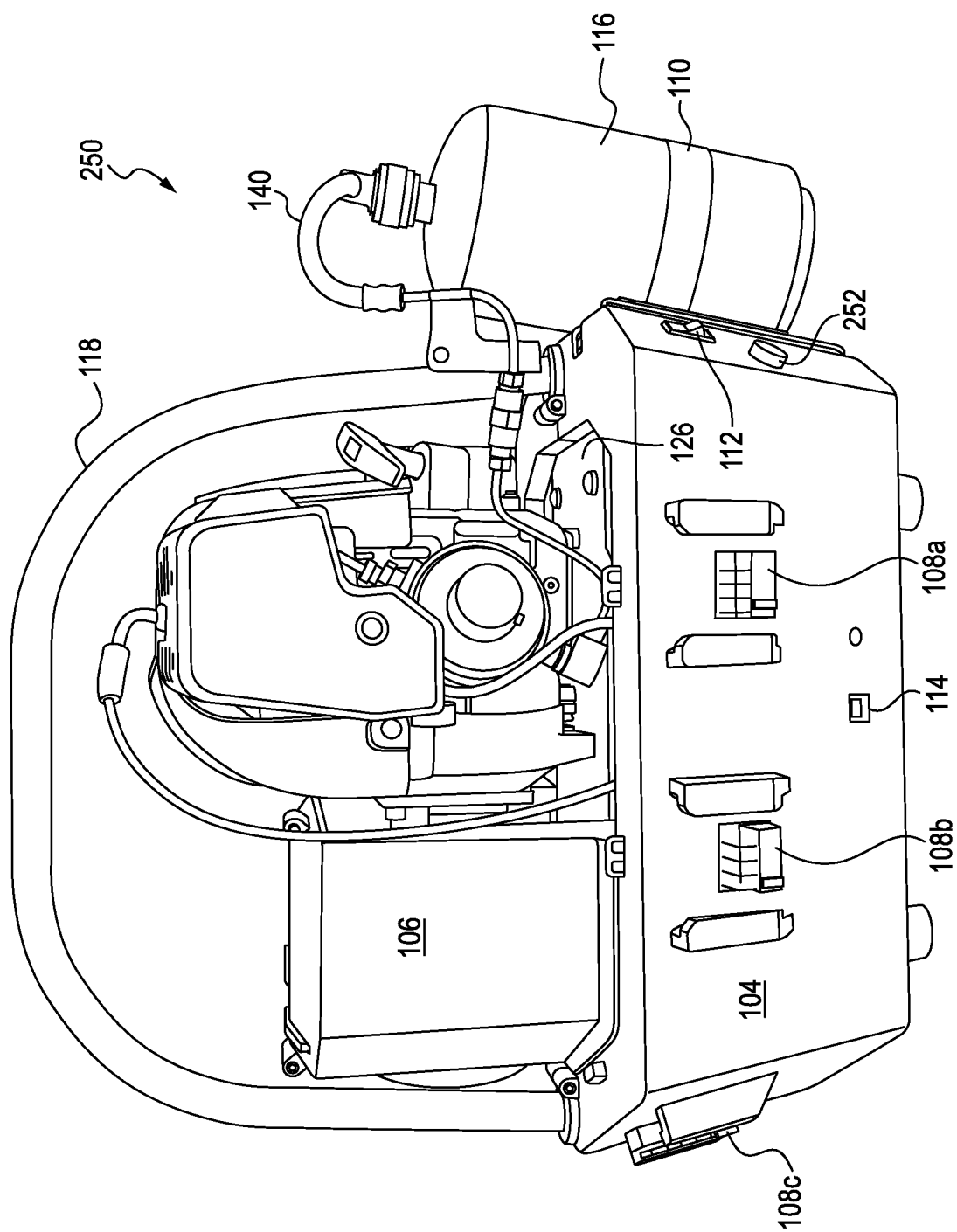
FIG. 12 illustrates a portable propane-fueled battery charger corresponding to the block diagram of FIG. 11.
Figure 13:
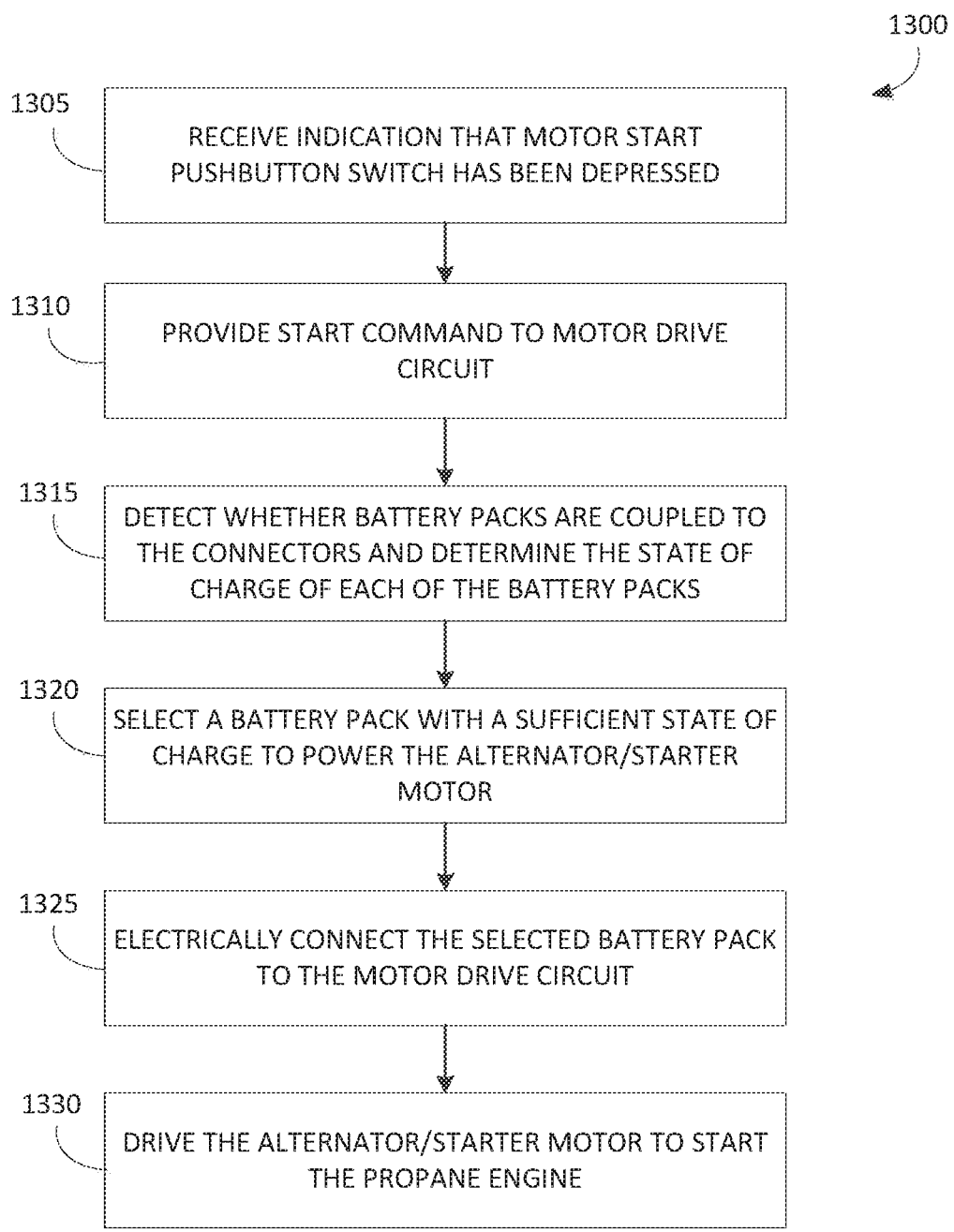
FIG. 13 illustrates a method of starting an engine of the propane-fueled battery charger of FIGS. 11 and 12 according to some embodiments.

FIG. 9 illustrates a method 900 of operation of the charger 100. At block 905, the engine 120 receives propane from the propane tank 116 via a fuel line 140 and a valve 142. The propane engine 120 includes a recoil/pull starter 144 that a user pulls to start the propane engine 120 (at block 910). Alternatively, in some embodiments, the charger 100 may include a pushbutton switch 252 (FIGS. 11 and 12) that is used to start the propane engine 120 as explained in greater detail below (FIG. 13). The propane received through the fuel line 140 is combusted via spark ignition to provide motive force to pistons that is mechanically translated to rotationally drive an output shaft (at block 915). The output shaft is mechanically coupled to a permanent magnet rotor of the alternator 122, such that the rotor is rotationally driven by the output shaft of the propane engine 120 (also at block 915). The rotating magnets of the rotor induce current in the stator coils of the alternator 122 that are positioned around the rotor (at block 920). The current induced in the stator coils is then fed into the electrical circuit 134 between the upper support plate 126 and base plate 130 (at block 925). The electrical circuit 134 determines whether a battery pack (e.g., the battery pack 150) is coupled to one or more of the battery connectors 108 (at block 930). For example, the electrical circuit 134 may determine that a battery pack is coupled to one of the battery connectors 108 in response a signal provided by the battery pack over the battery connector 108 to the electrical circuit 134 or in response to a change in a characteristic (e.g., voltage level) on a terminal of the battery connectors 108 in response to coupling of a battery pack thereto. The electrical circuit 134 further includes charging circuitry that charges the battery pack by supplying current provided by the alternator 122 to the battery pack (at block 935).

As explained in greater detail below, in some embodiments, the charger 100 may charge two battery packs simultaneously. Furthermore, in some embodiments, at block 930, the electrical circuit 134 may determine which of the battery connectors 108 are coupled to battery packs 150 and, the in step 935, may provide charging current to at least one of the battery packs 150. In some embodiments, at block 935, the charger 100 may continue to charge the battery pack 150 until the battery pack 150 is fully charged. As explained in greater detail below, when the battery pack 150 is fully charged, the charger 100 may begin charging another battery pack that is coupled to one of the battery connectors 108. Furthermore, in some embodiments, the charger 100 may continue to charge the battery pack 150 until the electrical circuit 134 receives a signal that indicates a different battery pack should be charged (e.g., a signal from sequence switches 160 and 162) as explained in greater detail below.

As noted above, the charger 100 includes an on/off toggle switch 112 (see, e.g., FIG. 1). Referring back to FIG. 9, in some embodiments, the electrical circuit 134 determines the position of the on/off toggle switch 112 to determine whether the propane engine 120 is started at block 910. When in the "off" position, the on/off toggle switch 112 prevents or breaks an electrical connection between a spark plug of the propane engine 120 and/or a power source and between circuit boards of the charger 100 and a power source (e.g., one of the battery packs 150 coupled to one of the battery connectors 108). When in the "on" position, the on/off toggle switch 112 makes or no longer prevents one or both of these electrical connections. Accordingly, in some embodiments, the method 900 does not start the propane engine 120 at block 910 unless the on/off toggle switch 112 is in the "on" position.

Figure 2:
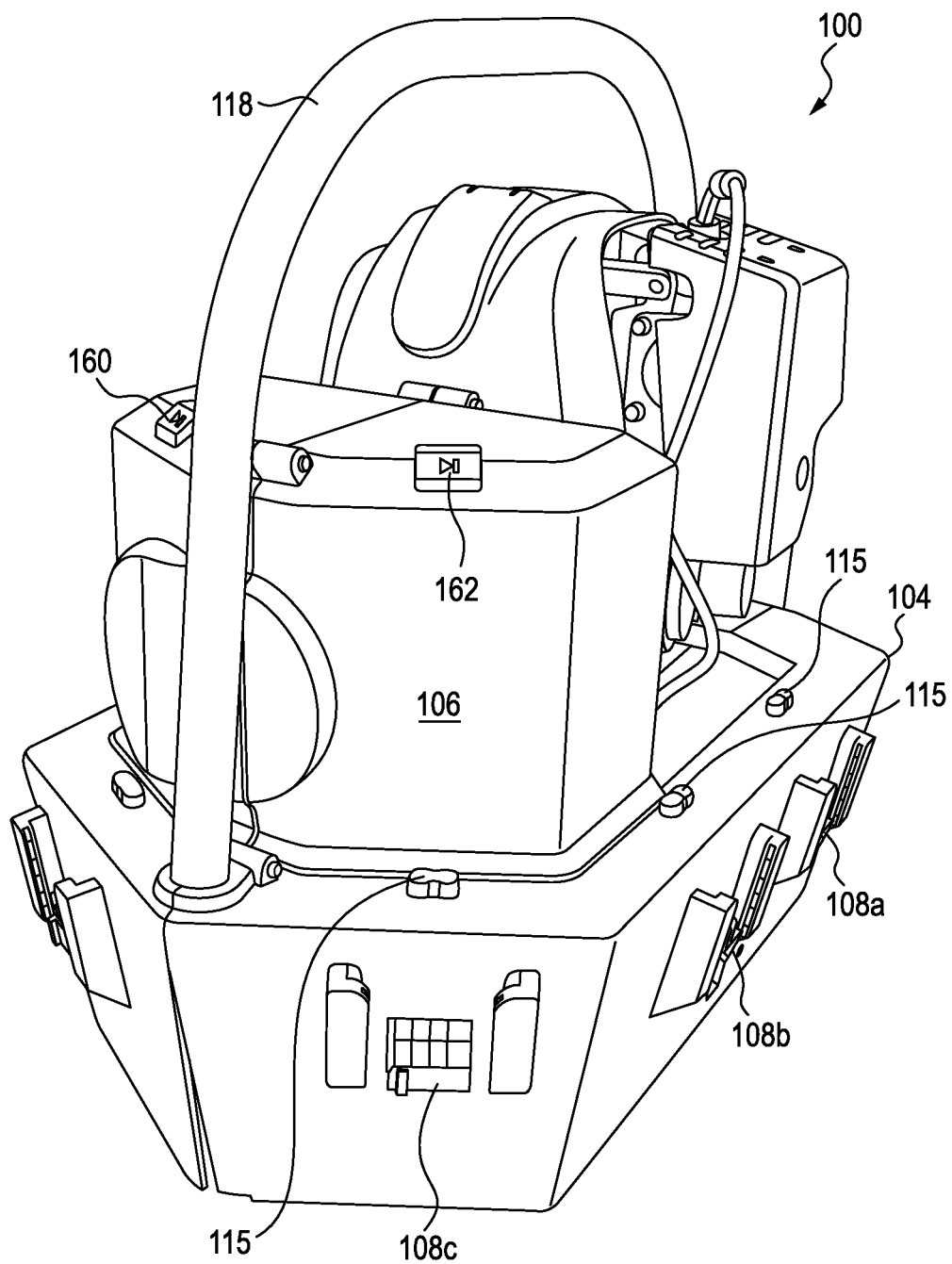
FIG. 2 illustrates a second perspective view of the portable propane-fueled battery charger of FIG. 1.
Figure 3:
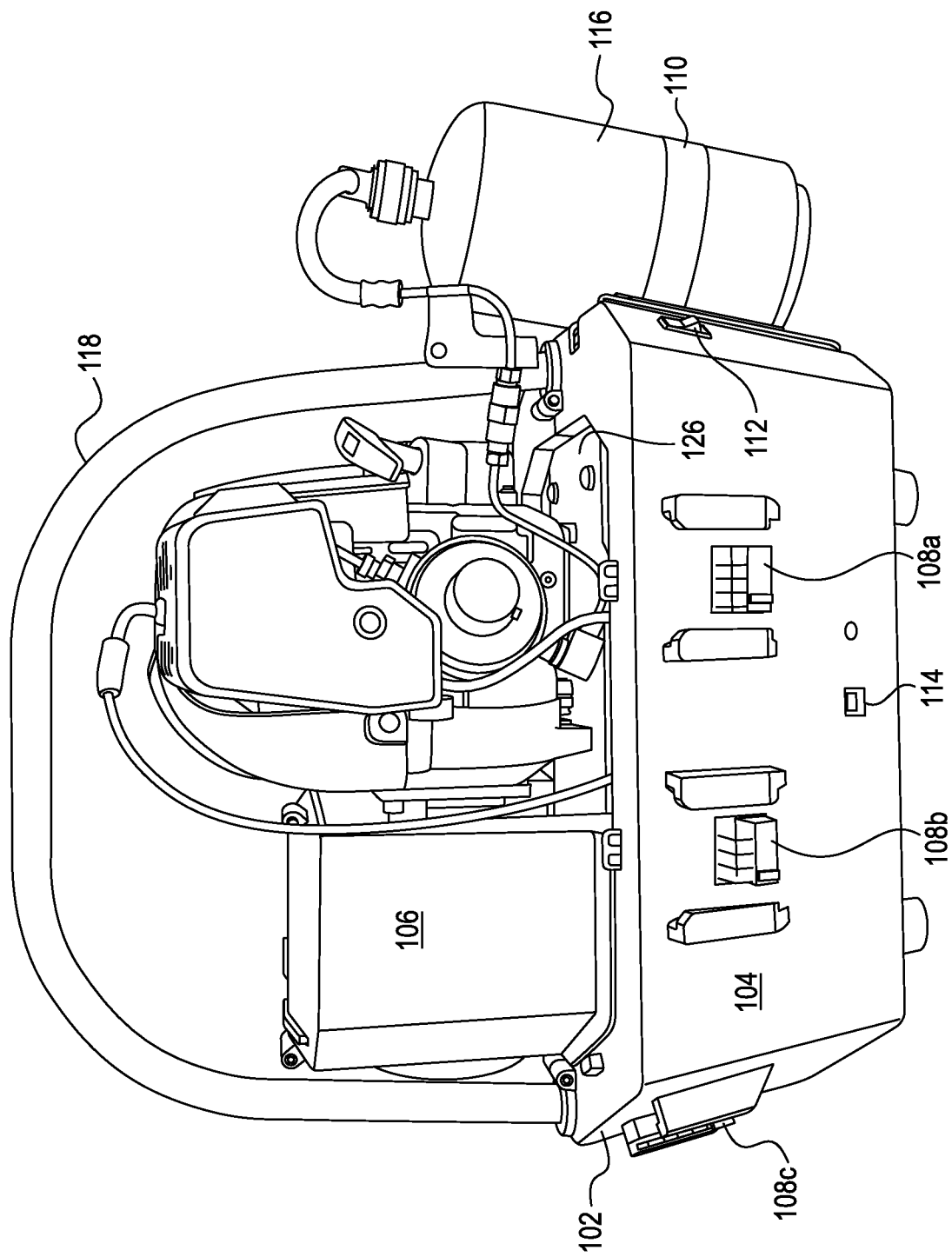
FIG. 3 illustrates a side view of the portable propane-fueled battery charger of FIG. 1.
Figure 4:
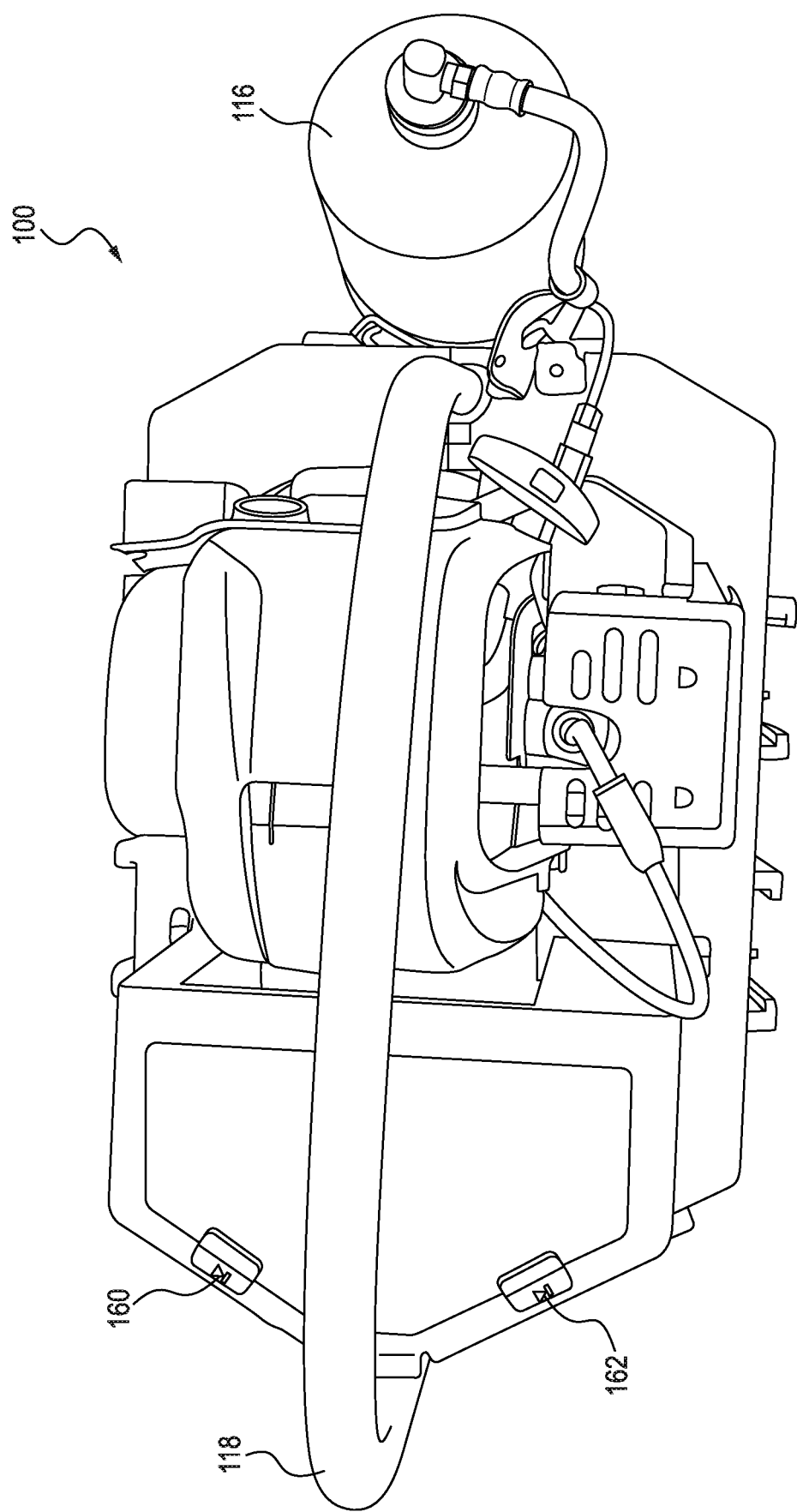
FIG. 4 illustrates a top view of the portable propane-fueled battery charger of FIG. 1.
Figure 5:
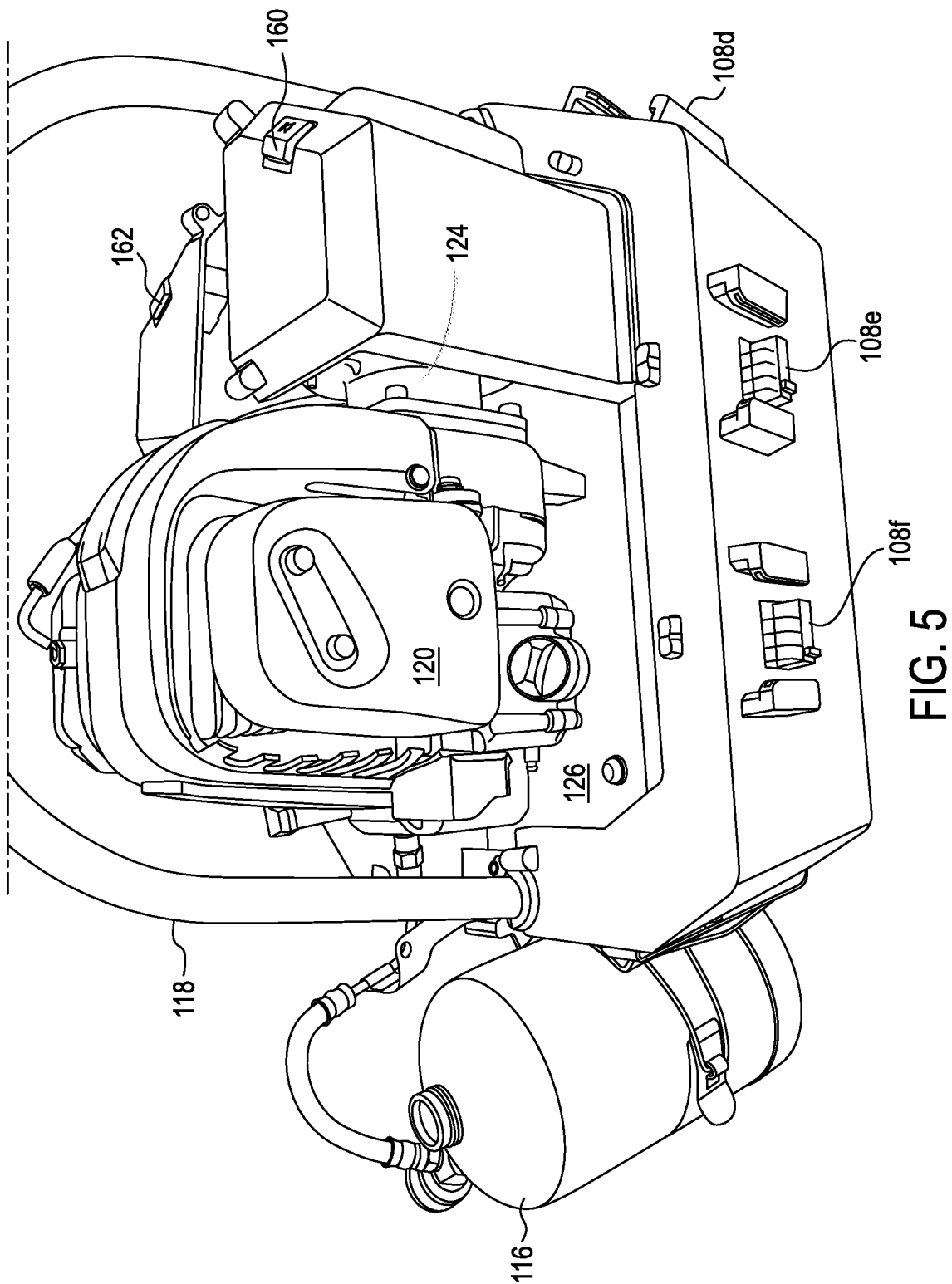
FIG. 5 illustrates a third perspective view of a portion of the portable propane-fueled battery charger of FIG. 1.
Figure 6:
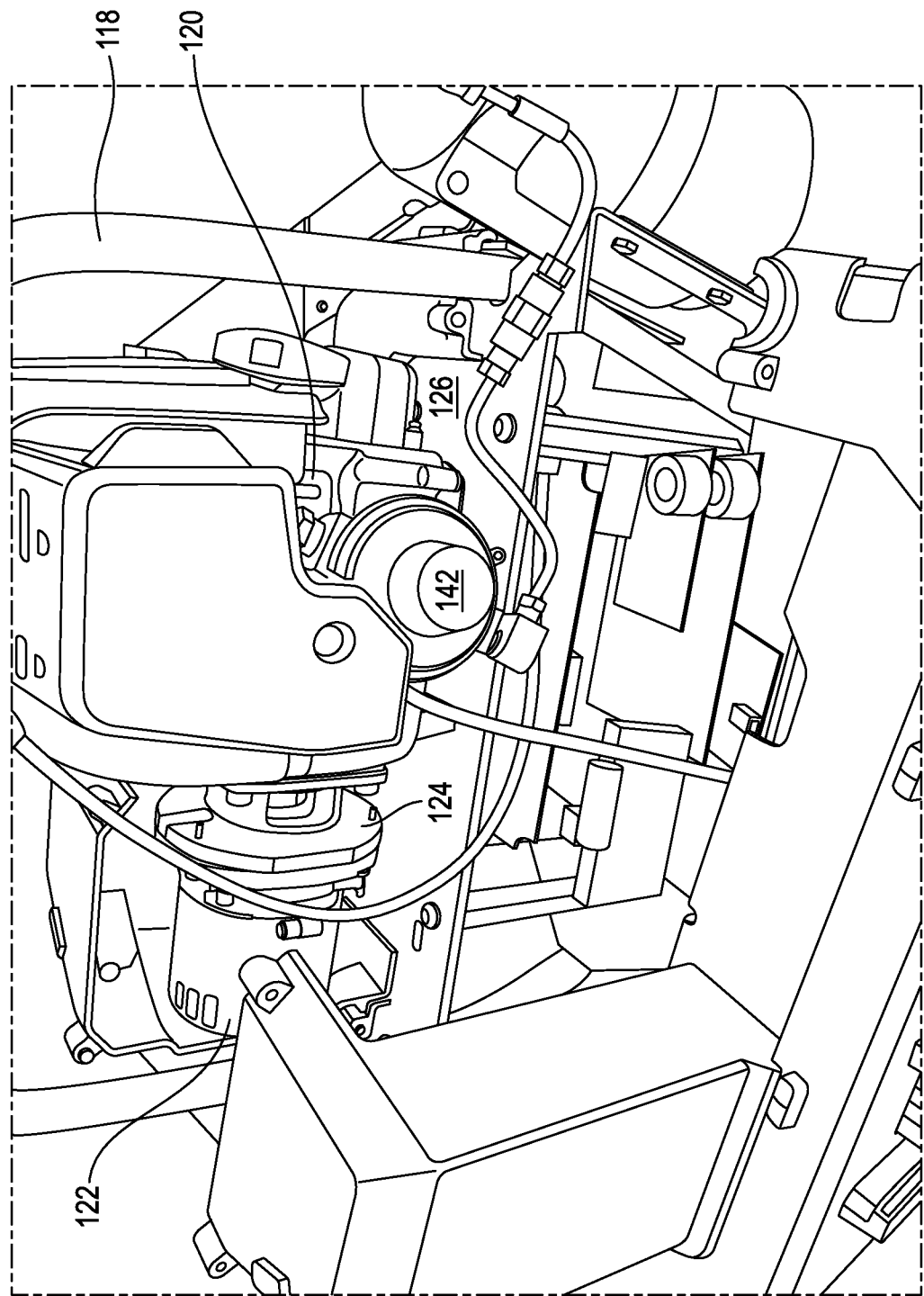
FIG. 6 illustrates a perspective side view of a portion of the portable propane-fueled battery charger of FIG. 1 with a clam shell housing separated.

Turning to FIG. 2, the upper housing portion 106 includes a left sequence switch 160 and a right sequence switch 162. The left sequence switch 160 is associated with battery connectors 108*d-f*, while the right sequence switch 162 is associated with battery connectors 108*a-c*. The electrical circuit 134 of the charger 100 includes two charging circuits, one associated with battery connectors 108*d-f* and the other associated with battery connectors 108*a-c* (see, e.g., FIG. 10). At a given moment, the charger 100 is operable to supply charging current to one of the three battery connectors 108*a-c* and one of the three battery connectors 108*d-f*. Accordingly, the charger 100 is operable to simultaneously charge two battery packs 150. The right sequence switch 162 is a push-button that enables a user to cycle through and select which one of the battery packs 150 coupled to the battery connectors 108*a-c* is to be charged, while the left sequence switch 160 is a push-button that enables a user to cycle through and select which one of the battery packs 150 coupled to the battery connectors 108*d-f* is to be charged. After a battery pack 150 is fully charged, the charging circuitry will automatically cycle to the next battery pack 150 to be charged on the respective side of the charger 100.

Figure 10:
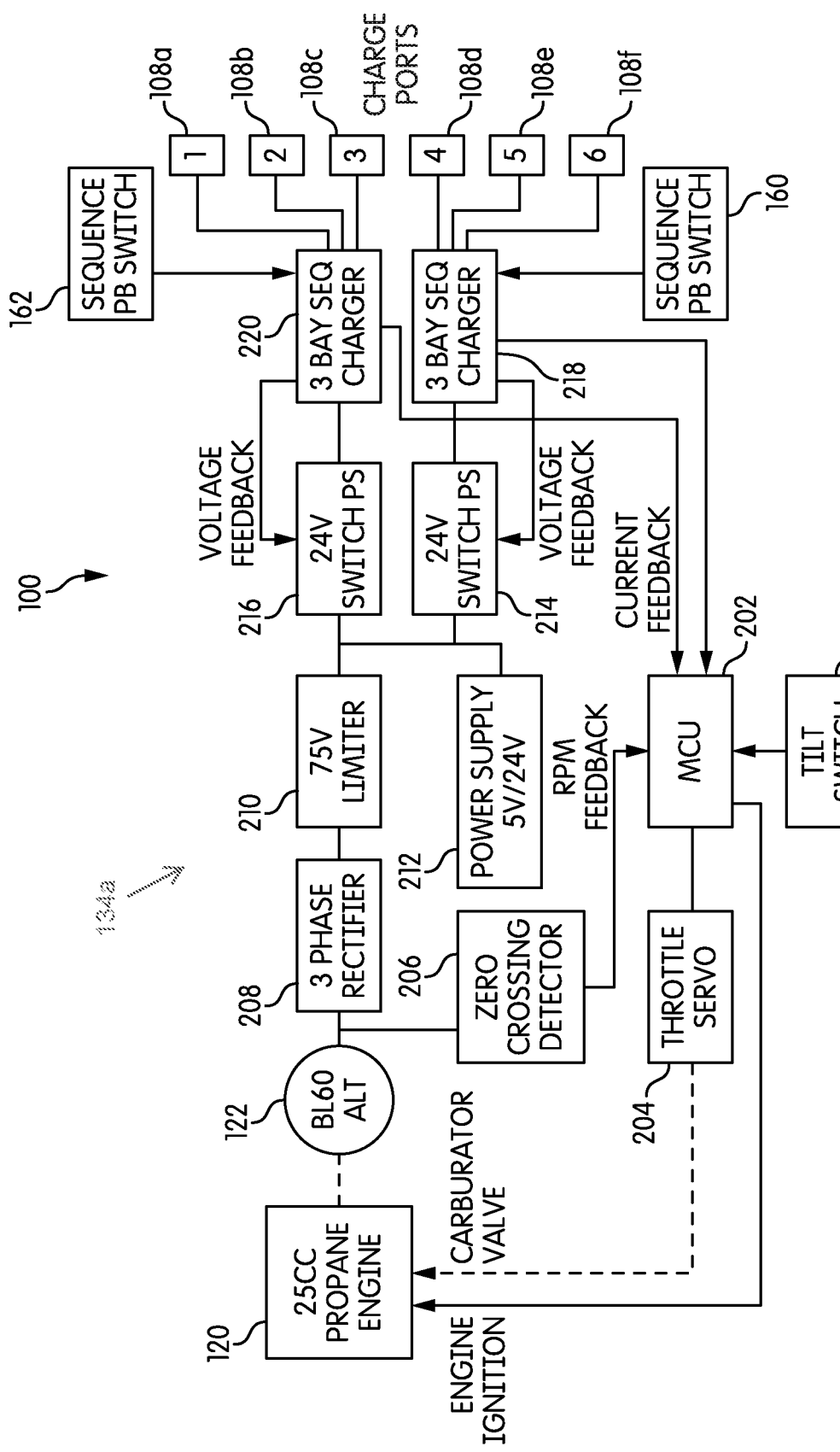
FIG. 10 is a block diagram of the portable propane-fueled battery charger of FIG. 1.

FIG. 10 illustrates a block diagram of the charger 100 including the engine 120, alternator 122, and battery connectors 108, as well as the electrical circuit 134*a* within the housing 102. The electrical circuit 134*a* is an embodiment of the electrical circuit 134 and includes a microcontroller (MCU) 202, a zero-crossing detector 206, a three-phase rectifier 208, a 75V limiter 210, a power supply 212, a left 24V switch power supply (PS) 214, a right 24V switch PS 216, a left three-bay sequence charger 218, and a right three-bay sequence charger 220.

The microcontroller (MCU) 202 sends an engine ignition signal to the propane engine 120 and that is coupled to a throttle servo 204. The engine ignition signal is an enable/disable signal for the engine 120. When an "enable" signal is sent, the engine 120 is able to run; when a "disable" signal is sent, the engine 120 is stopped and prevented from running. The MCU 202 sends control signals to the throttle servo 204 to adjust a carburetor valve of the engine 120 and, thereby, the speed of the engine 120. As noted above, the engine 120 drives a rotor of the alternator 122, which induces current in stator coils of the alternator 122. The current induced in and output by the stator coils is sinusoidal and provides three-phase alternating current (AC) power (one phase per coil). The output AC power is monitored by the zero-crossing detector 206 and is received by the three-phase rectifier 208. The zero-crossing detector 206 detects when the AC power crosses zero (e.g., alternates from negative to positive or from positive to negative) and provides an indication of each zero crossing (e.g., via a pulse) to the MCU 202. The MCU 202 can infer the rotational speed, e.g., rotations per minute (RPM), of the engine 120 from the timing of the indications.

The three-phase rectifier 208 converts the AC power to direct current (DC) power and provides the DC power to the 75V limiter 210. The 75V limiter 210 limits the DC power to 75V and provides the limited DC power to the power supply 212, to the left 24V switch power supply (PS) 214, and to the right 24V switch PS 216. The power supply 212 conditions and outputs 5V and 24V supply voltages to circuitry within the charger 100. For instance, although not shown, the power supply 212 outputs 5V power to the MCU 202 to power the MCU 202.

The left and right 24V power supplies 214 and 216 condition the received DC power from the 75V limiter 210 and provide DC power at a level determined by voltage feedback received from the left three-bay sequence charger 218 and the right three-bay sequence charger 220, respectively. For instance, when a battery pack 150 coupled to the battery connector 108*f* is being initially charged, the left 24V power supply 214 may provide a 24V supply voltage at 5 amperes (A) to the left three-bay sequence charger 218. Eventually, the left three-bay sequence charger 218 may provide an indication (voltage feedback) to the left 24V power supply 214 that the battery pack 150 is getting closer to being fully charged. In turn, the left 24V power supply 214 may reduce the current to 3A, and then eventually to zero once the battery pack 150 is fully charged.

The power supply 212 also outputs a 24V supply voltage to the left and right three-bay sequence chargers 218, 220 to provide power for communications between coupled battery packs and the sequence chargers 218, 220.

The three-bay sequence chargers 218 and 220 receive a signal from the left and right sequence switches 160 and 162, respectively, upon their depression by a user. In response, the three-bay sequence charger 218 or 220 will cycle to its next battery connector 108 having an attached battery pack 150, and begin providing charging current to that battery pack 150 as appropriate depending on the pack's state of charge.

The three-bay sequence chargers 218 and 220 also provide current feedback to the MCU 202 indicating the amount of charging current that each sequence charger 218 and 220 is presently outputting. In turn, the MCU 202 controls the driving of the alternator 122 by the engine 120. For instance, the MCU 202 can increase the speed of the engine 120 if the sequence chargers 218 and/or 220 are outputting a large amount of current and can decrease the speed of the engine 120 if a lower amount of current is being output.

For proper operation, the engine 120 should generally be upright as shown, e.g., in FIGS. 1-7. The charger 100 also includes a tilt switch 222 to ensure that the engine 120 is operated in the upright or near upright position. The tilt switch 222 outputs a first signal when the charger 100 is upright or near upright (e.g., within 25° of upright). For instance, with reference to the charger 100 of FIGS. 1-7, when all four feet 132 are on a level surface, the charger 100 is upright, and the tilt switch 222 outputs a 0V DC signal to the MCU 202. When the charger 100 is tipped over (e.g., more than 25°, the tilt switch 222 outputs an indication that the charger 100 has tilted in excess of a predetermined amount. In response, the MCU 202 shuts down the engine 120. In some embodiments, the tilt switch 222 outputs an analog signal representing the level of tilt to the MCU 202. The MCU 202 then determines whether the indicated tilt level (angle) exceeds a threshold and whether to shut down the engine 120. Accordingly, the MCU 202 controls the engine 120 to stop based on an output received from the tilt switch 222.

Figure 11:
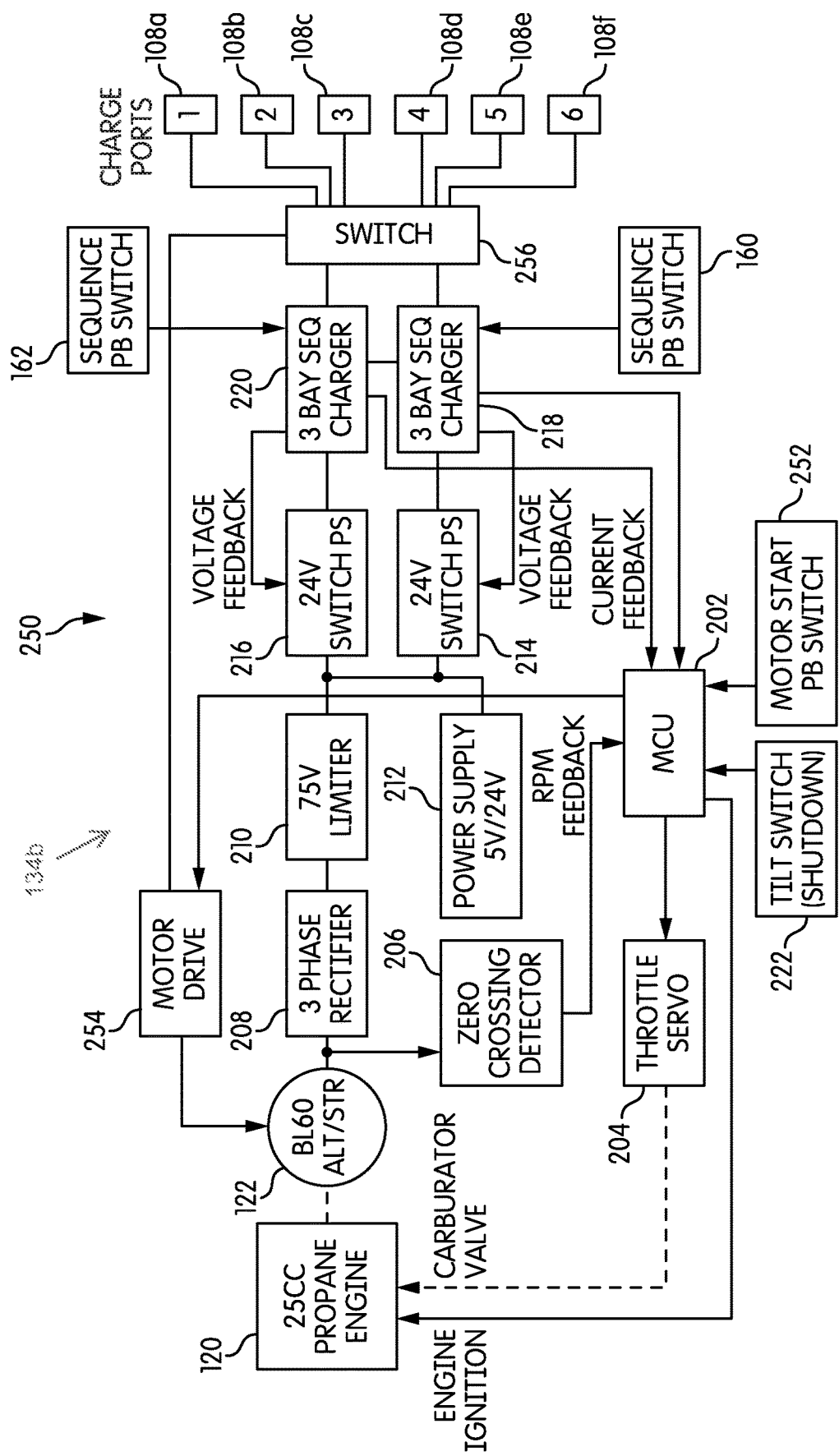
FIG. 11 is a block diagram of a portable propane-fueled battery charger according to another embodiment of the invention.

FIG. 11 illustrates a block diagram for a portable, propane-fueled battery charger 250 (charger 250), which is another embodiment of the charger 100. The charger 250 is generally similar to the charger 100 except for the addition of electronic starting functionality shown in FIG. 11 and the addition of a motor start pushbutton switch 252 on the housing 102 as shown in FIG. 12. Accordingly, the description of the physical components of the charger 100 provided with respect to FIGS. 1-7 apply to the charger 250 as well. Moreover, like numbered components of the block diagrams in FIGS. 10 and 11 have similar functionality, unless otherwise provided below.

As shown in FIG. 11, the charger 250 includes similar components as the charger 100 and further includes the motor start pushbutton switch 252 (start switch 252), a motor drive circuit 254, and a switch 256. The charger 250 includes an electrical circuit 134*b*, which is another embodiment of the electrical circuit 134 that is similar to the electrical circuit 134*a* of FIG. 10 but further includes the motor drive circuit 254 and the switch 256. FIG. 13 illustrates a method 1300 of starting the propane engine 120 that may be executed by the MCU 202 as a part of block 910 of the method 900 (FIG. 9) in some embodiments. In response to a user depression of the start switch 252, the start switch 252 outputs an indication to the MCU 202 (at block 1305). In turn, the MCU 202 provides a start command to the motor drive circuit 254 (at block 1310). The switch 256 includes multiple FETs that are controlled by the MCU 202 to select one of the battery connectors 108 that is presently coupled to a battery pack 150 to the motor drive circuit 254. The MCU 202 is operable to detect whether battery packs 150 are coupled to the battery connectors 108 and the state of charge of the battery packs 150 (at block 1315). For example, the battery packs 150 may provide a signal to the MCU 202 upon connector to a battery connector 108 such that the MCU 202 detects the presence of the battery pack 150. Additionally, the battery packs 150 or the electrical circuit 134*b* may include a state of charge sensor that provides a signal indicative of the state of charge of the battery pack (e.g., based on a voltage measurement) to the MCU 202. The MCU 202 then selects one of the battery packs 150 with a sufficient state of charge for powering the alternator/starter motor 122 (at block 1320). The MCU 202 controls the switch 256 (via a wired communication path not shown) to make an electrical connection between the selected battery back 150 and the motor drive circuit 254 (at block 1325). The motor drive circuit 254 then drives the alternator/starter motor 122 to start the propane engine 120 (at block 1330).

The motor drive circuit 254 is configured to selectively apply current from the switch 256 to the stator coils of the alternator 122 to drive the rotor. The motor drive circuit 254 may include, for instance, six field effect transistors (FET) in a bridge configuration. The MCU 202 selectively outputs enable and disable signals to each FET to selectively apply the current from the switch 256 to the stator coils of the alternator 122. The selectively energized stator coils generate a changing magnetic field that drives the rotor. The rotor, in turn, drives the drive shaft of the engine 120 to assist in starting the engine 120 in a similar way as occurs through a manual pull of the recoil/pull starter 144. Thus, the alternator 122 also serves as a starting motor.

Engine spark during an initial turn over phase of the propane engine 120 can result in an increased starting torque, making it difficult for the alternator/starter motor 122 to complete its starting revolutions and start the propane engine 120. To counter this occurrence, in some embodiments, the charger 100 and 250 include an easy start mode. In the easy start mode, the MCU 202 does not provide the engine ignition signal to the engine 120 during an initial starting period of the engine 120, which prevents sparking by a spark plug of the engine 120. In other words, the MCU 202 implements a spark delay. By not providing power to the spark plug during the spark delay, less torque is needed to turn the drive shaft to start the engine 120. Once the alternator/starter motor 122 has reached a peak rotational momentum or exceeded a momentum threshold, the spark is enabled and the engine 120 starts.

The spark delay is the time period between the MCU 202 first sending drive commands to the motor drive circuit 254 to start the engine 120 and the MCU 202 first sending the engine ignition signal to the engine 120 to power its spark plug. The spark delay is a function of the momentum of the engine 120, which can be determined via the engine speed based on outputs of the zero-crossing detector 206. Alternatively, the spark delay may be a predetermined time period (e.g., saved in the MCU 202), may be based on the number of zero crossings detected or indicated by the zero-crossing detector 206 or a combination thereof.

Accordingly, with the easy start mode, less force is required of the alternator/starter motor 122. This reduction in required starting torque allows a smaller alternator/starter motor 122 to be used in the charger 250 than if power was provided to the spark plug of the engine 120 during starting. Similar spark delay principles are applicable to a manual start using the recoil/pull starter 144, reducing the force required by the user to pull the recoil/pull starter 144.

Thus, embodiments of the invention provide, among other things, a portable, propane-fueled battery charger with a propane-fueled engine-generator, the charger configured to provide power to charge power tool battery packs.

We claim:

1. A battery charger comprising:
    a housing that supports a battery connector configured to receive and support a battery pack, the battery connector including
        electrical terminals configured to engage electrical terminals of the battery pack, and
        a mechanical coupling configured to engage a mechanical interface of the battery pack;
    a carrying handle coupled to the housing;
    a propane fuel line;
    an engine including an output shaft, the engine configured to receive propane via the propane fuel line and rotationally drive the output shaft;
    an alternator including a rotor and stator coils, wherein the output shaft is mechanically coupled to the rotor, the rotor is rotationally driven by the output shaft, and an electrical current is induced in the stator coils by rotation of the rotor; and
    an electrical circuit that receives the electrical current and is configured to
        determine when the battery pack is coupled to the battery connector,
        charge the battery pack based on the determination;
        determine a state of charge of each of a plurality of battery packs coupled to the battery charger;
        select, based on the state of charge, a selected battery pack from the plurality of battery packs; and
        electrically connect the selected battery pack to a motor drive circuit, wherein the motor drive circuit supplies electrical current from the selected battery pack to power the alternator and start the engine.

2. A method of charging a battery pack, the method comprising:
    receiving and supporting, by a battery connector of a housing, the battery pack, the battery connector including electrical terminals that engage electrical terminals of the battery pack, and a mechanical coupling that engages a mechanical interface of the battery pack;
    receiving, by an engine, propane via a propane fuel line;
    at a point when the engine is not operating, power an alternator with electrical current supplied by the battery pack coupled to the battery connector to start the engine;
    rotationally driving an output shaft of the engine, the output shaft being mechanically coupled to a rotor of the alternator;
    inducing an electrical current in stator coils of the alternator by the rotational driving of the output shaft;
    providing the electrical current to an electrical circuit in the housing;
    determining, with the electrical circuit, that the battery pack is coupled to the battery connector; and
    charging, with the electrical circuit, the battery pack.

3. The method as claimed in claim 2, wherein the battery pack is a first battery pack, the method further comprising charging, with the electrical circuit, a second battery pack.

4. The method as claimed in claim 3, wherein charging, with the electrical circuit, the first battery pack includes charging, with the electrical circuit, the first battery pack when the first battery pack is coupled to a first set of battery connectors, and wherein charging, with the electrical circuit, the second battery pack includes charging, with the electrical circuit, the second battery pack when the second battery pack is coupled to a second set of battery connectors.

5. The method as claimed in claim 4, further comprising charging, with the electrical circuit, a third battery pack coupled to the first set of battery connectors when the electrical circuit determines that the first battery pack is fully charged.

6. The method as claimed in claim 4, further comprising:
    selectively controlling, with a first sequence switch, the electrical circuit to provide a first charging current through one of the first set of battery connectors; and
    selectively controlling, with a second sequence switch, the electrical circuit to provide a second charging current through one of the second set of battery connectors.

7. The method as claimed in claim 2, further comprising:
    determining a state of charge of each of a plurality of battery packs coupled to the battery connectors;
    selecting, based on the state of charge, a selected battery pack from the plurality of battery packs;
    electrically connecting, with the electrical circuit, the selected battery pack to a motor drive circuit; and
    powering, via the motor drive circuit, the alternator with electrical current supplied by the selected battery pack to start the engine.

8. The method as claimed in claim 2, further comprising adjusting a speed of the engine based on a charging current being provided to the battery pack.

9. The method as claimed in claim 2, further comprising:
    determining, with a tilt switch, when a battery charger is tilted in excess of a predetermined tilt threshold; and
    shutting down the engine, with the electrical circuit, when the tilt switch indicates that the battery charger is tilted in excess of the predetermined tilt threshold.

10. The method as claimed in claim 2, wherein starting the engine includes
    receiving, from a toggle switch, a toggle switch signal indicative of a position of the toggle switch;
    receiving, from an input unit, a start engine signal; and
    when the toggle switch signal indicates that the toggle switch is in a first position, starting the engine.

11. A battery charger comprising:
    a housing that supports a battery connector configured to receive and support a battery pack, the battery connector including
        electrical terminals configured to engage electrical terminals of the battery pack, and
        a mechanical coupling configured to engage a mechanical interface of the battery pack;
    a carrying handle coupled to the housing;
    a propane fuel line;

an engine including an output shaft, the engine configured to receive propane via the propane fuel line and rotationally drive the output shaft;

an alternator including a rotor and stator coils, wherein the output shaft is mechanically coupled to the rotor; and an electrical circuit coupled to the stator coils and configured to at a point when the engine is operating, receive an electrical current that is induced in the stator coils by rotation of the rotor and charge the battery pack with the electrical current, and at a point when the engine is not operating, power the alternator with electrical current supplied by the battery pack coupled to the battery connector to start the engine.

12. The battery charger of claim 11, wherein the battery pack is a first battery pack and the electrical circuit is configured to simultaneously charge a second battery pack.

13. The battery charger of claim 12, further comprising a first set of battery connectors including the battery connector and a second set of battery connectors, wherein the electrical circuit is configured to simultaneously charge the first battery pack coupled to one of the first set of battery connectors and the second battery pack coupled to one of the second set of battery connectors.

14. The battery charger of claim 13, wherein the electrical circuit is configured to charge a third battery pack coupled to the first set of battery connectors when the electrical circuit determines that the first battery pack is fully charged.

15. The battery charger of claim 13, further comprising a first sequence switch, wherein the first sequence switch is configured to selectively control the electrical circuit to provide a first charging current through one of the first set of battery connectors; and a second sequence switch, wherein the second sequence switch is configured to selectively control the electrical circuit to provide a second charging current through one of the second set of battery connectors.

16. The battery charger of claim 11, wherein the electrical circuit adjusts a speed of the engine based on a charging current being provided to the battery pack.

17. The battery charger of claim 11, further comprising a tilt switch that indicates when the battery charger is tilted in excess of a predetermined tilt threshold, wherein the electrical circuit shuts down the engine when the tilt switch indicates that the battery charger is tilted in excess of the predetermined tilt threshold.

18. The battery charger of claim 11, further comprising:

a toggle switch; and an input unit;

wherein the engine is configured to start when the toggle switch is in a first position and the input unit is activated.

19. The battery charger of claim 11, further comprising a first plate that supports the engine and the alternator; and a second plate that supports the electrical circuit, wherein the carrying handle is coupled to the housing via a connection to the second plate and extends out of through-holes in the housing, and wherein the second plate is substantially parallel with the first plate.

20. The battery charger of claim 11, further comprising a second battery connector coupled to the electrical circuit, wherein the housing encloses the electrical circuit and includes a first side face and a second side face, the electrical circuit is positioned between the first side face and the second side face, the battery connector is positioned on the first side face of the housing, and the second battery connector is positioned on the second side face of the housing.

* * * * *